United States Patent
Sakamoto et al.

(10) Patent No.: US 12,035,139 B2
(45) Date of Patent: Jul. 9, 2024

(54) COMMUNICATION SYSTEM, INFORMATION PROVIDING DEVICE, COMPUTER-READABLE MEDIUM, AND INFORMATION PROVIDING METHOD

(71) Applicant: e-Jan Networks Co., Tokyo (JP)

(72) Inventors: Shiro Sakamoto, Kanagawa (JP); Kumar Karvepaku, Andhra (IN)

(73) Assignee: e-Jan Networks Co., Tokyo (JP)

( * ) Notice: Subject to any disclaimer, the term of this patent is extended or adjusted under 35 U.S.C. 154(b) by 354 days.

(21) Appl. No.: 17/486,924

(22) Filed: Sep. 28, 2021

(65) Prior Publication Data
US 2022/0014924 A1   Jan. 13, 2022

Related U.S. Application Data

(63) Continuation of application No. PCT/JP2019/014521, filed on Apr. 1, 2019.

(51) Int. Cl.
*H04W 12/128*   (2021.01)
*H04W 12/06*   (2021.01)
(Continued)

(52) U.S. Cl.
CPC ......... *H04W 12/128* (2021.01); *H04W 12/06* (2013.01); *H04W 12/69* (2021.01); *H04W 76/10* (2018.02); *H04W 80/06* (2013.01)

(58) Field of Classification Search
CPC ... H04W 12/128; H04W 12/69; H04W 12/06; H04W 76/10; H04W 80/06
See application file for complete search history.

(56) References Cited

U.S. PATENT DOCUMENTS 8,275,890 B2 * 9/2012 Burckart ................. H04L 67/02
                                                                  709/227
8,635,265 B2 * 1/2014 Reeves ............... H04L 67/1034
                                                                  709/203

(Continued)

FOREIGN PATENT DOCUMENTS

CN    102118386 A    7/2011
CN    104702587 A    6/2015
(Continued)

OTHER PUBLICATIONS (ISA/237) Written Opinion of the International Search Authority for International Patent Application No. PCT/JP2019/014521, issued/mailed by the Japan Patent Office on Jun. 18, 2021.

(Continued)

*Primary Examiner* — Tauqir Hussain

(57) ABSTRACT

An information providing device arranged in a first network is provided including: an association storage section for storing user identification information and session identification information; a confirmation request transmitting section for transmitting, to a relay arranged in a second network, a confirmation request for confirming whether the relay has stored a connection request; an information receiving section for receiving information included in the connection request; a terminal authentication section for determining whether authentication of the communication terminal is permitted if the session identification information is not included in the information received; a session identification information assigning section for assigning session identification information when the authentication is determined to be permitted; a session identification information transmitting section for transmitting the session identification information to the relay; and an information providing section for providing information to the communication (Continued)

terminal if the session identification information is included in the information received.

17 Claims, 6 Drawing Sheets

(51) Int. Cl.
*H04W 12/69* (2021.01)
*H04W 76/10* (2018.01)
*H04W 80/06* (2009.01)

(56) References Cited

U.S. PATENT DOCUMENTS

| | | | | |
|---|---|---|---|---|
| 8,964,757 B2* | 2/2015 | Watson | ................ | H04W 76/16 370/468 |
| 10,440,124 B2* | 10/2019 | Kammerer | ............ | G06F 3/0484 |
| 10,523,715 B1* | 12/2019 | Jiang | ................ | H04L 61/2503 |
| 10,749,926 B2* | 8/2020 | Whitt | ................ | H04L 67/025 |
| 10,979,390 B2* | 4/2021 | Hiramoto | ............ | H04L 61/103 |
| 11,343,787 B2* | 5/2022 | Qiu | ................ | H04L 67/141 |
| 11,355,126 B2* | 6/2022 | Athias | ................ | G10L 15/26 |
| 2003/0162575 A1* | 8/2003 | Morota | ............ | H04M 1/72403 455/566 |
| 2005/0238033 A1* | 10/2005 | Sakamoto | ............ | H04L 69/329 370/229 |
| 2006/0041742 A1* | 2/2006 | Oba | ................ | H04L 63/08 726/4 |
| 2006/0184998 A1* | 8/2006 | Smith | ................ | H04L 41/0253 726/3 |
| 2006/0236095 A1* | 10/2006 | Smith | ................ | H04L 63/0272 713/153 |
| 2010/0165993 A1* | 7/2010 | Basilier | ............... | H04L 12/4641 370/395.53 |
| 2010/0211626 A1* | 8/2010 | Li | ............................ | H04L 67/14 709/227 |
| 2015/0153980 A1* | 6/2015 | Ito | ........................ | H04L 63/0281 358/1.14 |
| 2016/0286079 A1* | 9/2016 | Nishimura | ............ | G06F 3/1236 |
| 2017/0064003 A1* | 3/2017 | Kubota | ................ | H04L 67/63 |
| 2017/0257895 A1* | 9/2017 | Kawakami | ............. | H04M 11/00 |
| 2018/0041498 A1* | 2/2018 | Kikuchi | ................ | H04L 63/101 |
| 2018/0047227 A1* | 2/2018 | Beavers | ............. | G07C 9/00571 |
| 2018/0124050 A1* | 5/2018 | Sakamoto | ............. | H04M 11/00 |
| 2019/0104127 A1* | 4/2019 | Da Silva Peixoto | ........................ | H04L 12/413 |
| 2019/0357043 A1* | 11/2019 | Hu | ........................ | H04L 9/0643 |
| 2019/0394351 A1* | 12/2019 | Saito | ...................... | G06F 3/1238 |
| 2020/0053163 A1* | 2/2020 | Ngo | ........................ | H04L 69/16 |
| 2020/0092272 A1* | 3/2020 | Eisen | .................. | H04L 63/0869 |
| 2020/0178080 A1* | 6/2020 | Yasaki | ................. | H04L 9/0822 |
| 2020/0288374 A1* | 9/2020 | Henry | .................. | H04W 40/22 |
| 2021/0029118 A1* | 1/2021 | Ohkubo | .............. | H04L 63/0884 |
| 2021/0126979 A1* | 4/2021 | Ngo | ........................ | H04L 69/16 |

FOREIGN PATENT DOCUMENTS

| | | |
|---|---|---|
| JP | 2004528651 A | 9/2004 |
| JP | 4551218 B2 | 9/2010 |
| JP | 2010282460 A | 12/2010 |
| JP | 2013140480 A | 7/2013 |
| JP | 2016181877 A | 10/2016 |
| WO | 2013042412 A1 | 3/2013 |

OTHER PUBLICATIONS

Office Action issued for counterpart Japanese Application No. 2021-511808, issued by the Japan Patent Office on Jul. 20, 2021 (drafted on Jul. 14, 2021).

Office Action issued for counterpart Taiwanese Application 109111151, issued by the Taiwan Intellectual Property Office on Apr. 17, 2023.

Extended European Search Report for European Patent Application No. 19922905.5, issued by the European Patent Office on Aug. 16, 2022.

* cited by examiner

COMMUNICATION SYSTEM, INFORMATION PROVIDING DEVICE, COMPUTER-READABLE MEDIUM, AND INFORMATION PROVIDING METHOD

The contents of the following Japanese application are incorporated herein by reference: NO. PCT/JP2019/014521 filed in WO on Apr. 1, 2019

BACKGROUND

1. Technical Field

The present invention relates to a communication system, an information providing device, a computer-readable medium, and an information providing method.

2. Related Art

A communication system is known which performs control so that data in a closed network can be viewed from a communication terminal located in an open network (see, for example, Patent Literature 1).

CITATION LIST

Patent Literature

Patent Literature 1: Japanese Patent Publication No. 4551218

Problem to be Solved by the Invention

It is desirable to provide a technology capable of appropriately providing information in a closed network to a communication terminal in an open network.

DESCRIPTION OF EXEMPLARY EMBODIMENTS

The invention will be described below through embodiments of the invention, but the following embodiments do not limit the invention as claimed. Furthermore, not all of the combinations of features described in the embodiments are essential to the solution of the invention.

Figure 1:
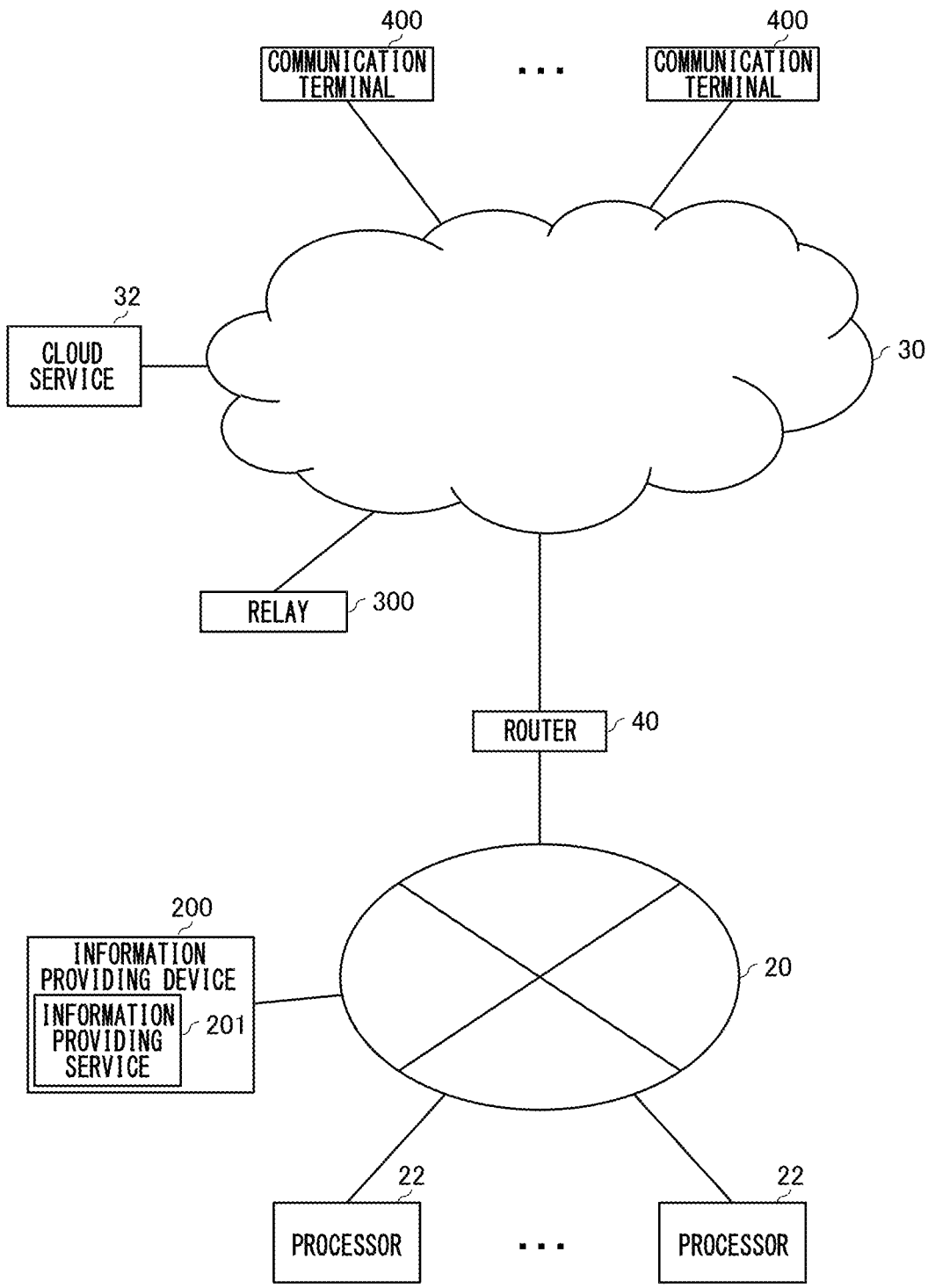
FIG. 1 schematically shows an example of a communication system 10.

FIG. 1 schematically shows an example of a communication system 10. The communication system 10 includes an information providing device 200 and a relay 300.

The information providing device 200 is arranged in a network 20, which is a closed network. The information providing device 200 provides information in the closed network to a communication terminal 400 arranged in a network 30, which is an open network. The network 20 may be an example of a first network. The network 30 may be an example of a second network.

The network 20 is, for example, an in-factory network or an in-house network where access from an open network is restricted. Here, a description will be given mainly on an example in which the network 20 is the in-factory network. The network 30 includes, for example, the Internet. The communication terminal 400 is, for example, a mobile phone, such as a smartphone, a tablet terminal, a Personal Computer (PC) and the like.

In the in-factory network, a plurality of processing device 22 that control machines installed in the factory or manage data in the factory are installed. In factories around the world, there is a need to back up the data stored in the processing device 22 or to retrieve log data.

Many factories around the world continue to use old processing devices 22, and in many cases, the Operating System (OS) of the processing devices 22 has not been upgraded. Therefore, when the in-factory network is directly connected to an open network, there is a relatively high possibility that the processing device 22 will be infected with a virus.

It is also conceivable to take out the data of the processing device 22 in a portable storage medium, such as a USB memory. However, some factories do not take anti-virus measures sufficiently in the in-factory network, and the processing device 22 may have been infected with a virus in some cases. Therefore, virus-infected data may be taken out by a USB memory, causing the virus to spread.

The communication system 10 of the present embodiment provides a technology that appropriately provides data in the network 20 connected to the network 30 via a router 40 with a firewall function, to the communication terminal 400 arranged in the network 30.

The router 40 may be set to allow a connection request from the network 20 to the network 30 to pass through the router 40, but not to allow a connection request from the network 30 to the network 20 to pass through the router 40. The router 40 may be set such that it allows the connection request from the network 20 to the network 30 to pass through the router 40, while it does not allow a connection request transmitted from the network 30 side toward the network 20 side to pass through the router 40 in a flow initiated on the network 30 side, but allows a connection request transmitted from the network 30 side toward the network 20 side to pass through the router 40 in a flow initiated on the network 20 side.

In the present embodiment, the communication terminal 400 transmits, to the relay 300, a connection request to the information providing device 200, for example, when it logs into an information providing service 201 provided by the information providing device 200. The connection request may include user identification information (sometimes referred to as a user ID) of a user who uses the communication terminal 400. The connection request may include a password. The connection request may include communication terminal identification information (sometimes referred to as a communication terminal ID) for identifying the communication terminal 400. The connection request may include information providing device identification information (sometimes referred to as an information providing device ID) for identifying the information providing device 200. A relay 300 stores the received connection request.

The information providing device 200 transmits, to the relay 300, a confirmation request for confirming whether the relay 300 has stored the connection request to the information providing device 200, transmitted by the communication terminal 400. The confirmation request may include the information providing device ID of the information providing device 200.

The information providing device 200 establishes a session with the relay 300 and transmits the confirmation request to the relay 300 via the session. The information providing device 200 establishes, for example, a Hyper Text Transfer Protocol (HTTP) session with the relay 300. The information providing device 200 may establish a session by establishing a Transmission Control Protocol (TCP) connection with the relay 300.

The information providing device 200 may intermittently execute transmission of the confirmation request to the relay 300. The information providing device 200 may execute transmission of the confirmation request to the relay 300 on a regular basis. The information providing device 200 executes transmission of the confirmation request to the relay 300, for example, every second.

In a case where the relay 300 receives the confirmation request, it confirms whether it has stored therein a connection request to the information providing device 200 that has transmitted the confirmation request. In a case where the information providing device ID is included in each of the connection request and the confirmation request, the relay 300 may confirm whether it has stored therein the connection request including the information providing device ID by referring to the information providing device ID included in the confirmation request. As long as the relay 300 can recognize the information providing device 200 that has transmitted the confirmation request even when the information providing device ID is not included in the confirmation request, the confirmation request does not need to include the information providing device ID.

In a case where the relay 300 has stored therein the connection request to the information providing device 200, the relay 300 transmits the information included in the connection request to the information providing device 200. The relay 300 may transmit a user ID included in the connection request, to the information providing device 200. The relay 300 may transmit a password included in the connection request, to the information providing device 200. The relay 300 may transmit a communication terminal ID included in the connection request, to the information providing device 200.

In a case where the relay 300 does not store the connection request to the information providing device 200, the relay 300 may transmit a response indicating that it does not have the connection request stored therein, to the information providing device 200. Upon receiving the response, the information providing device 200 may disconnect the HTTP session with the relay 300.

The relay 300 does not need to respond to the information providing device 200 in a case where it does not have the connection request to the information providing device 200 stored therein. In this case, the information providing device 200 may disconnect the HTTP session with the relay 300 if it did not receive the information included in the connection request from the relay 300 until a predetermined time has elapsed after transmitting the confirmation request.

As described above, the relay 300 receives and stores the connection request transmitted by the communication terminal 400, and then transmits the information included in the connection request to the information providing device 200 in response to the confirmation request transmitted by the information providing device 200, so that the router 40 can cause the information providing device 200 to acquire the information included in the connection request even when the router 40 is set such that it does not allow the connection request from the network 30 to the network 20 to pass through the router 40.

In a case where the router 40 may be set such that it does not allow the connection request transmitted from the network 30 side toward the network 20 side to pass through the router 40 in the flow initiated on the network 30 side, but allows the connection request transmitted from the network 30 side toward the network 20 side to pass through the router 40 in the flow initiated on the network 20 side, the relay 300 may transmit the connection request or the information included in the connection request, to the information providing device 200 in the flow initiated by transmission of the confirmation request by the information providing device 200.

The information providing device 200 determines whether authentication of the communication terminal 400 is permitted based on the received user ID. The information providing device 200 refers to registration information including the user IDs which have already been registered in the information providing service 201, for example, and determines that authentication is permitted if one of the user IDs in the registration information matches with the received user ID. Alternatively, for example, the information providing device 200 refers to the registration information including the user IDs which have already been registered in the information providing service 201 and passwords corresponding to the user IDs, and determines that authentication is permitted if one of the user IDs and its password in the registration information match with the received user ID and password, respectively.

In a case where the authentication is determined to be permitted, the information providing device 200 assigns session identification information (sometimes referred to as a session ID) for identifying the session between the information providing device 200 and the communication terminal 400, causing the user ID of the user of the communication terminal 400 and the session ID to be stored in an association storage section, in association with each other. Subsequently, the information providing device 200 transmits the session ID to the communication terminal 400 via the relay 300. The information providing device 200 may transmit information indicative of data that can be provided to the communication terminal 400, together with the session ID. For example, the information providing device 200 transmits, to the communication terminal 400, information indicative of the data, among the data in the network 20, that can be provided to the communication terminal 400. After transmitting the session ID, the information providing device 200 may disconnect the HTTP session with the relay 300.

The user of the communication terminal 400 specifies, for example, data they desire to be provided with, at the communication terminal 400. The data may be any data that can be provided by the information providing device 200. For example, this data is data in the network 20. Examples of the data include, but are not limited to, log data, backup data, file data, email data, web data, and the like.

The communication terminal 400 may include a user interface that receives the specification of data and may receive the specification of data via the user interface. For example, the communication terminal 400 may present the user with information indicative of data received from the information providing device 200 which can be provided to the communication terminal 400, and it may receive the user's specification for the information.

When the communication terminal 400 receives the specification of data, the communication terminal 400 transmits a connection request including data specification information specifying the data and the session ID to the relay 300. The connection request may include the information providing device ID for identifying the information providing device 200.

The relay 300 stores the received connection request. When the relay 300 receives the confirmation request from the information providing device 200, the relay 300 transmits information included in the connection request to the information providing device 200 if the relay 300 has the connection request stored therein. The relay 300 may transmit the data specification information and the session ID to the information providing device 200.

The information providing device 200 may determine whether transmission of the data specified by the data specification information is permitted, based on the received session ID. The information providing device 200 determines whether the received session ID matches with any of the plurality of session IDs stored in the association storage section.

If the received session ID does not match with any of the stored sessions IDs, the information providing device 200 determines that the transmission is not permitted. If the received session ID matches with any of the stored sessions IDs, the information providing device 200 confirms, by means of the user ID stored in association with the matched session ID, an access authority of the user identified by the user ID to the data specified by the data specification information. If the user is confirmed to have the access authority, the information providing device 200 determines that the transmission is permitted. If the user is confirmed not to have the access authority, the information providing device 200 determines that the transmission is not permitted.

If the transmission is determined to be permitted, the information providing device 200 may acquire the data specified by the data specification information and transmit it to the relay 300. The information providing device 200 receives, from the processing device 22, the data specified by the data specification information and managed by the processing device 22 in the network 20, for example, and transmits the data or transmission data generated from the data to the relay 300. For example, if log data is specified, the information providing device 200 transmits the log data or list data generated from a plurality of pieces of log data, to the relay 300. The relay 300 transmits the received data to the communication terminal 400. After the transmission, the information providing device 200 may disconnect the HTTP session with the relay 300.

As described above, the information providing device 200 according to the present embodiment disconnects the HTTP session with the relay 300 for each connection request. In HTTP, session keep-alive is employed. When an HTTP session is established between two devices, the HTTP session is usually maintained unless one of the two devices disconnects the HTTP session.

Therefore, for example, when an HTTP session is established between two devices across the router 40 having the firewall function as exemplified in the present embodiment, the HTTP session may be disconnected at an unexpected time if a firewall has a session timeout function. The session timeout function serves to disconnect the session in response to the elapse of a predetermined time after the session has been established via the router 40. When the session is disconnected by the session timeout function, the user may not be able to grasp the reason for the disconnection, which may confuse the user.

In contrast, since the information providing device 200 according to the present embodiment establishes a new HTTP session for each connection request, the probability of occurrence of a situation in which the HTTP session is disconnected by the session timeout function can be reduced significantly, thereby preventing the occurrence of a situation in which the user gets confused.

As described above, when a session ID is not included in the connection request, the information providing device 200 according to the present embodiment executes terminal authentication by means of the user ID included in the connection request, assigns a session ID and transmits it to the communication terminal 400. In contrast, when a session ID is included in the connection request, the information providing device 200 provides information to the communication terminal 400 in response to the information included in the connection request. In this way, by assigning the session ID to the communication terminal 400 on the software by the information providing device 200, the continuity of communication can be guaranteed regardless of the disconnection of the session for each connection request. This eliminates the need to execute terminal authentication for each connection request, thereby reducing the procedures between the relay 300 and the information providing device 200, so that the speed of response to the communication terminal 400 can be improved.

Figure 2:
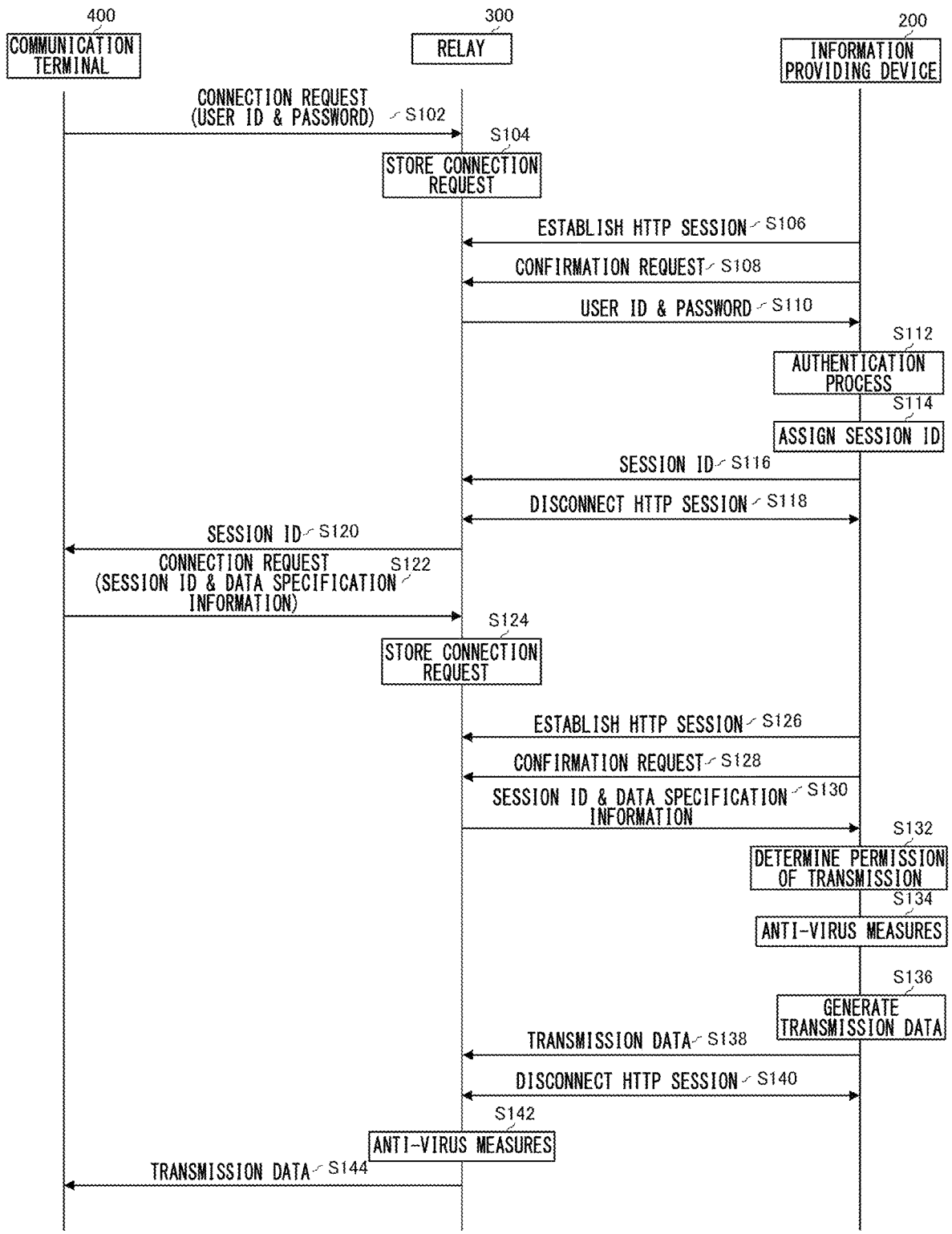
FIG. 2 schematically shows an example of a processing flow executed by the communication system 10.

FIG. 2 schematically shows an example of a processing flow executed by the communication system 10. Here, a description will be given on the flow where the user of the communication terminal 400 logs into the information providing service 201 provided by the information providing device 200 using the communication terminal 400 and then is provided with data in the network 20 from the information providing device 200. Here, it is assumed that the registration of the user of the communication terminal 400 in the information providing service 201 is completed. The processing of establishing communication connection between the communication terminal 400 and the relay 300 is omitted from the description.

In step (note that herein step may be abbreviated as S) 102, the communication terminal 400 transmits a connection request including a user ID and a password of a user of the communication terminal 400 to the relay 300. In S104, the relay 300 stores the connection request received in S102.

In S106, the information providing device 200 establishes an HTTP session with the relay 300. In S108, the information providing device 200 transmits a confirmation request to the relay 300. The relay 300 confirms whether it has stored therein a connection request to the information providing device 200 in response to the reception of the confirmation request. In an example illustrated in FIG. 2, the relay 300 determines it has the connection request stored therein.

In S110, the relay 300 transmits the user ID and the password included in the connection request to the information providing device 200. After transmitting the user ID and the password to the information providing device 200, the relay 300 may delete or invalidate the connection request including the user ID and the password.

In S112, the information providing device 200 determines whether authentication of the communication terminal 400 is permitted, based on the user ID and the password received in S110. In the example illustrated in FIG. 2, the information providing device 200 determines that the authentication is possible.

In S114, the information providing device 200 assigns a session ID for identifying a session between the information providing device 200 and the communication terminal 400 and then causes the session ID and the user ID to be stored in the association storage section, in association with each other. In S116, the information providing device 200 transmits the session ID to the relay 300.

In S118, the HTTP session established in S106 is disconnected. This disconnection may be executed mainly by the information providing device 200. The information providing device 200 executes the disconnection, for example, by specifying the closing of TCP connection in the HTTP header. Alternatively, this disconnection may be executed mainly by the relay 300. The relay 300 executes the disconnection, for example, by specifying the closing of the TCP connection in the HTTP header, in response to the reception of the session ID in S116.

In S120, the relay 300 transmits the session ID received in S116 to the communication terminal 400. In S122, the communication terminal 400 transmits, to the relay 300, a connection request including the session ID received in S120 and data specification information specifying data specified by the user. In S124, the relay 300 stores the received connection request.

In S126, the information providing device 200 establishes an HTTP session with the relay 300. In S128, the information providing device 200 transmits the confirmation request to the relay 300. The relay 300 confirms whether it has stored therein a connection request to the information providing device 200 in response to the reception of the confirmation request. In an example illustrated in FIG. 2, the relay 300 determines that it has the connection request stored therein.

In S130, the relay 300 transmits the session ID and the data specification information, included in the connection request, to the information providing device 200. After transmitting the session ID and the data specification information to the information providing device 200, the relay 300 may delete or invalidate the connection request including the session ID and the data specification information.

In S132, the information providing device 200 determines whether transmission of the data specified by the data specification information is permitted, based on the session ID received in S130. Hereinafter, the description will continue assuming that the transmission is determined to be permitted.

In S134, the information providing device 200 acquires the data specified by the data specification information and then executes anti-virus measures. The anti-virus measures may include a virus determination process to determine whether the acquired data is infected with a virus, and a virus handling process to handle the virus for the data if the data is determined to be infected. The virus handling process may remove the virus or repair the data. The virus handling process may also quarantine, isolate, or delete part of the specified data.

In S136, the information providing device 200 generates transmission data to be provided to the communication terminal 400. The transmission data may be the data itself specified by the data specification information. The transmission data may also be data generated from the data specified by the data specification information.

In S138, the information providing device 200 transmits the transmission data to the relay 300. In S140, the HTTP session established in S126 is disconnected. This disconnection may be executed mainly by the information providing device 200. The information providing device 200 executes the disconnection, for example, by specifying the closing of the TCP connection in the HTTP header. Alternatively, this disconnection may be executed mainly by the relay 300. The relay 300 executes the disconnection, for example, by specifying the closing of the TCP connection in the HTTP header, in response to the reception of the transmission data in S138.

In S142, the relay 300 executes the anti-virus measures on the transmission data received in S138. The level of the anti-virus measures executed by the relay 300 in S142 may be higher than the level of the anti-virus measures executed by the information providing device 200 in S134. For example, the information providing device 200 executes the anti-virus measures using only its own information, while the relay 300 executes the anti-virus measures in cooperation with a cloud service 32 that provides an anti-virus service. In S144, the relay 300 transmits the transmission data to the communication terminal 400.

As described above, when the information providing device 200 provides the data to the communication terminal 400, the information providing device 200 is configured to execute the anti-virus measures, while the relay 300 is configured to execute the anti-virus measures, the level of which is higher than that of the anti-virus measures executed by the information providing device 200. With this configuration, a process load can be appropriately distributed between the information providing device 200 and the relay 300. By such double-checking, the anti-virus measures can be executed with high accuracy, as compared to single-checking, whereby the security of the communication terminal 400 can be enhanced.

The communication system 10 executes the processes illustrated in FIG. 2, and the network 20 is connected to the network 30 via the router 40 having the firewall function, so that the data in the network 20 can be transmitted to the communication terminal 400 arranged in the network 30, while preventing the processing device 22 in the network 20 from being infected with a virus. Furthermore, the anti-virus measures can be executed by double-checking on the data in the network 20, thereby enhancing the security. This can appropriately assist in backup of data, retrieval of log data, and the like in factories around the world.

Figure 3:
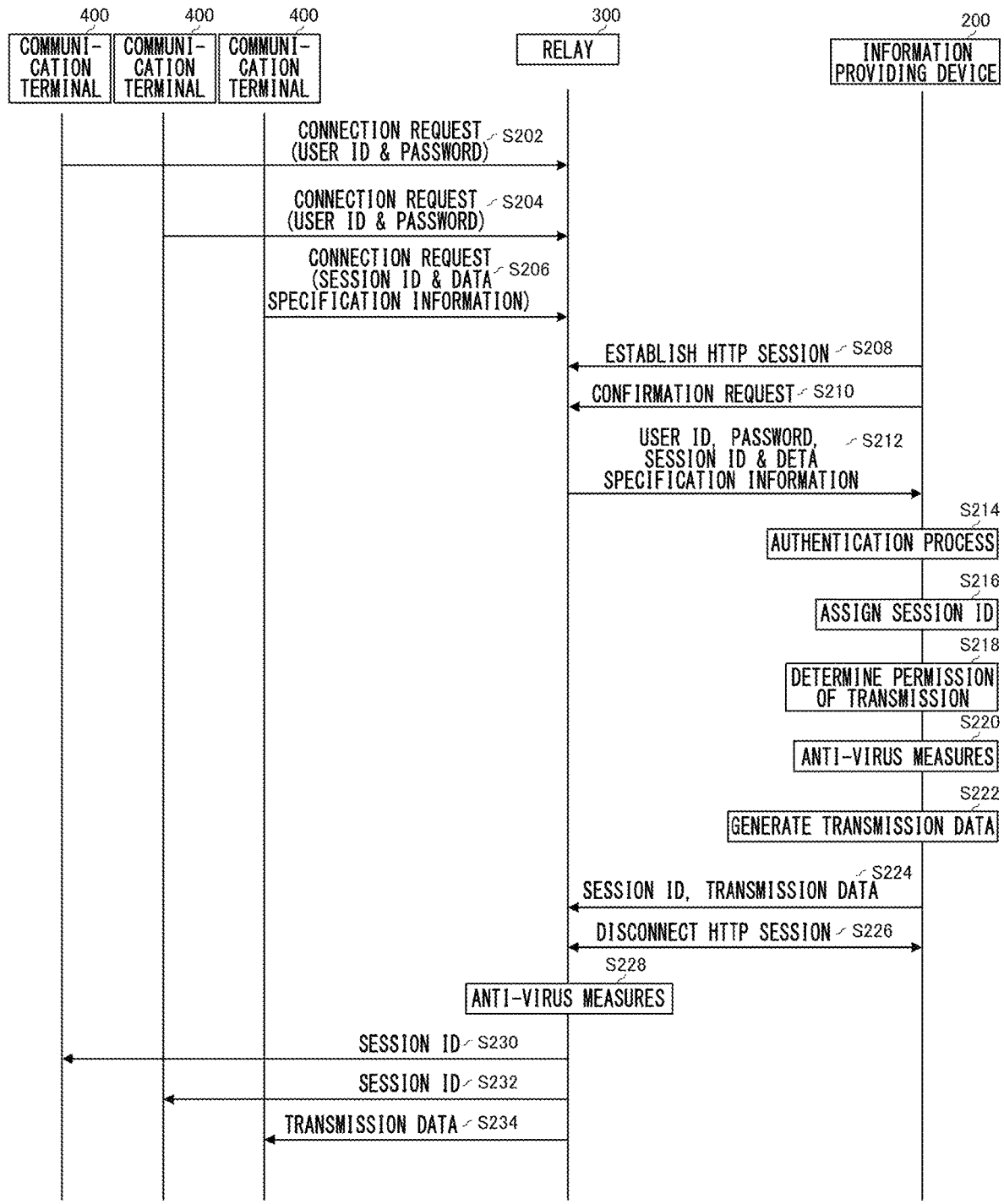
FIG. 3 schematically shows another example of a processing flow executed by the communication system 10.

FIG. 3 schematically shows an example of a processing flow executed by the communication system 10. Hereinafter, differences from FIG. 2 will be mainly described.

In S202, a first communication terminal 400 transmits a connection request including a user ID and a password to the relay 300. The relay 300 stores the received connection request. In S204, a second communication terminal 400 transmits a connection request including a user ID and a password to the relay 300. The relay 300 stores the received connection requests. In S206, a third communication terminal 400 transmits a connection request including a session ID and data specification information, to the relay 300. The relay 300 stores the received connection request.

In S208, the information providing device 200 may establish an HTTP session between the relay 300 and the information providing device 200. In S210, the information providing device 200 transmits a confirmation request to the relay 300. The relay 300 confirms whether it stores a connection request to the information providing device 200 in response to the reception of the confirmation request. In an example illustrated in FIG. 3, the relay 300 determines that it stores the connection request.

In S212, the relay 300 transmits the user IDs and the passwords as well as the session ID and the data specification information, included in each of the three connection requests, to the information providing device 200.

In S214, the information providing device 200 determines whether authentication of the first communication terminal 400 and the second communication terminal 400 is possible, based on the user IDs and the passwords received in S212. Hereinafter, the description will continue assuming that the authentication is determined to be possible. In S216, the information providing device 200 assigns a session ID for identifying a session between the information providing device 200 and the first communication terminal 400 and then causes the session ID and the user ID of the user of the first communication terminal 400 to be stored in the association storage section, in association with each other. In addition, the information providing device 200 assigns a session ID for identifying a session between the information providing device 200 and the second communication terminal 400 and then causes the session ID and the user ID of the user of the second communication terminal 400 to be stored in the association storage section, in association with each other.

In S218, the information providing device 200 determines whether transmission of the data specified by the data specification information received in S212 is permitted. Hereinafter, the description will continue assuming that the transmission is determined to be permitted. In S220, the information providing device 200 acquires the data specified by the data specification information and then executes anti-virus measures. In S222, the information providing device 200 generates transmission data to be provided to the communication terminal 400.

In S224, the information providing device 200 transmits the session IDs assigned in S216 and the transmission data generated in S222, to the relay 300. In S226, the HTTP session established in S208 is disconnected. This disconnection may be executed mainly by the information providing device 200. The information providing device 200 executes the disconnection, for example, by specifying the closing of TCP connection in the HTTP header. Alternatively, this disconnection may be executed mainly by the relay 300. The relay 300 executes the disconnection, for example, by specifying the closing of the TCP connection in the HTTP header, in response to the reception of the session ID and the transmission data in S224.

In S228, the relay 300 executes the anti-virus measures on the transmission data received in S224. In S230, the relay 300 transmits the session ID received in S224 to the first communication terminal 400. In S232, the relay 300 transmits the session ID received in S224 to the second communication terminal 400. In S234, the relay 300 transmits, to the third communication terminal 400, the transmission data on which the anti-virus measures is executed in S228.

As described above, the connection requests transmitted by the plurality of communication terminals 400 are configured to be collectively processed, making it possible to improve the overall processing efficiency.

Figure 4:
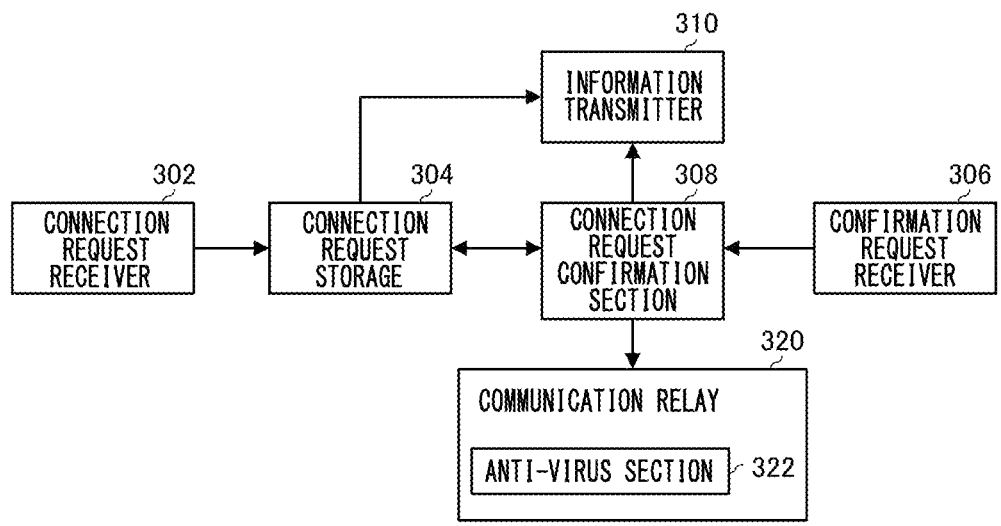
FIG. 4 schematically shows an example of a functional configuration of a relay 300.

FIG. 4 schematically shows an example of a functional configuration of the relay 300. The relay 300 includes a connection request receiving section 302, a connection request storage section 304, a confirmation request receiving section 306, a connection request confirmation section 308, an information transmitting section 310, and a communication relay 320.

The connection request receiving section 302 receives the connection request to the information providing device 200, which has been transmitted by the communication terminal 400. The connection request receiving section 302 may receive the connection request to the information providing device 200, which has been transmitted by the communication terminal 400 arranged in the network 30 where the relay 300 is arranged. The connection request receiving section 302 may receive the connection request transmitted by each of the plurality of communication terminals 400 arranged in the network 30.

The connection request storage section 304 stores the connection request received by the connection request receiving section 302. The connection request storage section 304 may store a plurality of connection requests received by the connection request receiving section 302. The connection request storage section 304 may store the connection request in association with the communication terminal ID of the communication terminal 400 which has transmitted the connection request.

The confirmation request receiving section 306 receives a confirmation request transmitted by the information providing device 200. The confirmation request may cause the relay 300 to confirm whether the connection request receiving section 302 stores the connection request.

The connection request confirmation section 308 confirms whether the connection request storage section 304 stores a connection request, in response to the confirmation request being received by the confirmation request receiving section 306. The connection request confirmation section 308 may confirm whether the connection request storage section 304 stores a connection request to the information providing device 200 which has transmitted the confirmation request. The connection request confirmation section 308 confirms, for example, whether the connection request storage section 304 stores a connection request including the information providing device ID which is the same as the information providing device ID included in the confirmation request.

The information transmitting section 310 transmits the information included in the connection request, to the information providing device 200 when the connection request confirmation section 308 confirms that the connection request is stored in the connection request storage section 304. The information transmitting section 310 transmits, for example, the user ID to the information providing device 200. The information transmitting section 310 transmits, for example, the user ID and the password to the information providing device 200. The information transmitting section 310 transmits, for example, the user ID, the password, and the communication terminal ID to the information providing device 200.

The information transmitting section 310 transmits, for example, the session ID to the information providing device 200. The information transmitting section 310 transmits, for example, the session ID and the data specification information to the information providing device 200. The information transmitting section 310 transmits, for example, the session ID, the data specification information, and the communication terminal ID to the information providing device 200.

The communication relay 320 relays the communication between the information providing device 200 and the communication terminal 400. The communication relay 320 transmits, for example, the session ID received from the information providing device 200 to the communication terminal 400.

The communication relay 320 transmits, for example, the transmission data received from the information providing device 200 to the communication terminal 400. The communication relay 320 may have an anti-virus section 322. The anti-virus section 322 executes anti-virus measures on the transmission data received from the information providing device 200. The anti-virus section 322 may execute the virus determination process to determine whether the transmission data received from the information providing device 200 is infected with a virus. The anti-virus section 322 may execute the virus handling process on the transmission data when the transmission data is determined to be infected with the virus in the virus determination process.

Figure 5:
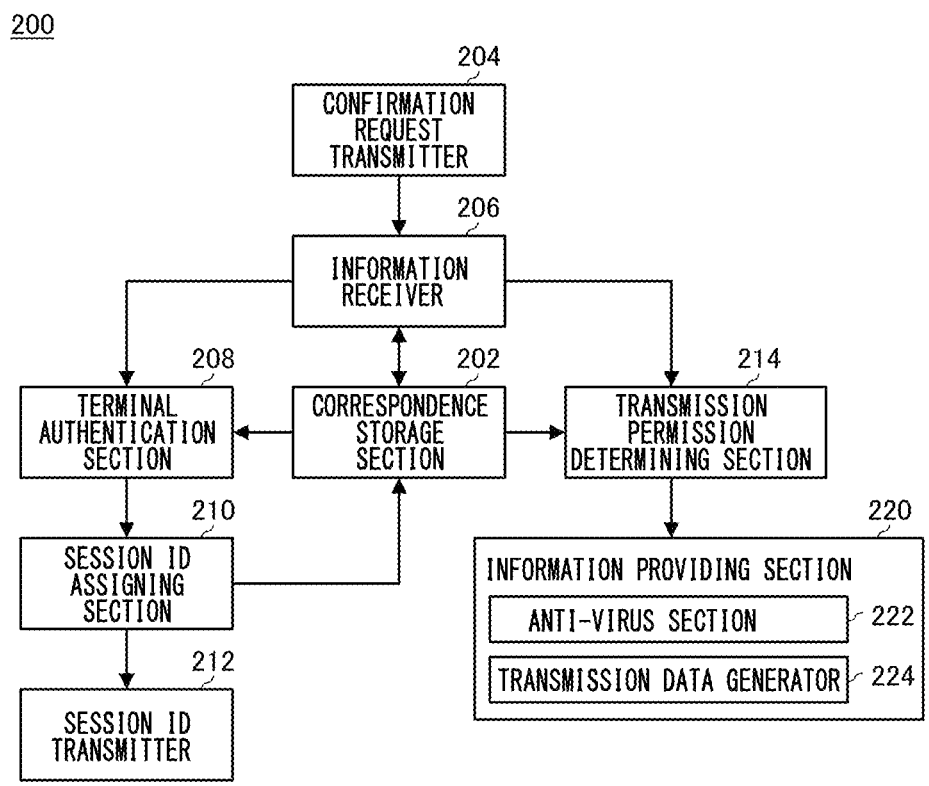
FIG. 5 schematically shows an example of a functional configuration of an information providing device 100.

FIG. 5 schematically shows an example of a functional configuration of the information providing device 200. The information providing device 200 includes an association storage section 202, a confirmation request transmitting section 204, an information receiving section 206, a terminal authentication section 208, a session ID assigning section 210, a session ID transmitting section 212, a transmission permission determining section 214, and an information providing section 220.

The association storage section 202 is a storage section for storing the session ID of the session between the information providing device 200 and the communication terminal 400 and the user ID of the user of the communication terminal 400 in association with each other.

The confirmation request transmitting section 204 transmits the confirmation request to the relay 300. The confirmation request transmitting section 204 may transmit, to the relay 300, the confirmation request for confirming whether the connection request storage section 304 stores the connection request to the information providing device 200 transmitted by the communication terminal 400 arranged in the network 30.

The confirmation request transmitting section 204 may establish a session between the relay 300 and the confirmation request transmitting section 204 and transmit the confirmation request to the relay 300 via the session. The confirmation request transmitting section 204 may establish an HTTP session between the relay 300 and the confirmation request transmitting section 204 and transmit the confirmation request to the relay 300 via the HTTP session. The confirmation request transmitting section 204 may establish a session by establishing a TCP connection between the relay 300 and the confirmation request transmitting section 204.

The information receiving section 206 receives the information included in the connection request from the relay 300. The information receiving section 206 receives, for example, the user ID transmitted by the information transmitting section 310. The information receiving section 206 receives, for example, the user ID and the password transmitted by the information transmitting section 310. The information receiving section 206 also receives, for example, the user ID, the password, and the communication terminal ID, which are transmitted by the information transmitting section 310.

The information receiving section 206 receives, for example, the session ID transmitted by the information transmitting section 310. The information receiving section 206 receives, for example, the session ID and the data specification information, which are transmitted by the information transmitting section 310. The information receiving section 206 receives, for example, the session ID, the data specification information, and the communication terminal ID, which are transmitted by the information transmitting section 310.

The information receiving section 206 may disconnect the session established by the confirmation request transmitting section 204 in response to the reception of the information included in the connection request from the relay 300. The information receiving section 206 may disconnect the session by disconnecting the TCP connection through the transmission of the HTTP header which specifies the closing of the TCP connection, to the relay 300.

The terminal authentication section 208 determines whether authentication of the communication terminal 400 is possible, based on the user ID received by the information receiving section 206 when the information receiving section 206 receives the information included in the connection request, but the session ID stored in the association storage section 202 is not included in the information received by the information receiving section 206. The terminal authentication section 208 may determine whether authentication of the communication terminal 400 is possible, based on the user ID received by the information receiving section 206 when the information receiving section 206 receives the information included in the connection request, but the valid session ID stored in the association storage section 202 is not included in the information received by the information receiving section 206. The information providing device 200 may transmit a user ID transmission request, which requests the transmission of the user ID, to the communication terminal 400 via the relay 300 when the session ID included in the information received by the information receiving section 206 does not match any of the session IDs stored in the association storage section 202, or when it matches an invalid session ID. When the communication terminal 400 receives the user ID transmission request, the communication terminal 400 may transmit the connection request including the user ID, to the relay 300.

The session ID assigning section 210 assigns a session ID for identifying a session between the information providing device 200 and the communication terminal 400 when the terminal authentication section 208 determines that the authentication is possible, and then causes the session ID and the user ID of the user of the communication terminal 400 to be stored in the association storage section 202, in association with each other. The session ID transmitting section 212 transmits the session ID assigned by the session ID assigning section 210, to the relay 300.

Before an elapsed time after the session ID transmitting section 212 transmits the session ID to the relay 300 becomes longer than a predetermined time, if the information receiving section 206 does not receive the same session ID as this session ID, the association storage section 202 may delete or invalidate the session ID. In other words, after the session ID assigning section 210 assigns a new session ID and then the session ID transmitting section 212 transmits the session ID to the relay 300, the association storage section 202 may delete or invalidate the session ID when the session ID has timed out without being used.

Before an elapsed time after the information receiving section 206 receives the session ID becomes longer than a predetermined time, if the information receiving section 206 does not receive the same session ID as this session ID, the association storage section 202 may delete or invalidate the session ID. In other words, after the session ID is used, the association storage section 202 may delete or invalidate the session ID when the session ID has timed out without being used.

The transmission permission determining section 214 determines whether transmission of the data specified by the data specification information received by the information receiving section 206 is permitted, based on the session ID received by the information receiving section 206. The transmission permission determining section 214 determines, for example, whether the session ID received by the information receiving section 206 matches any of the plurality of session IDs stored in the association storage section 202. If the received session ID does not match any of the stored sessions IDs, the transmission permission determining section 214 may determine that the transmission is not permitted. If the received session ID matches any one of the stored sessions IDs, the transmission permission determining section 214 confirms, by means of the user ID stored in association with the matched session ID, an access authority of the user identified by the user ID to the data specified by the data specification information. If the user is confirmed to have the access authority, the transmission permission determining section 214 may determine that the transmission is permitted. If the user is confirmed not to have the access authority, the transmission permission determining section 214 may determine that the transmission is not permitted.

The information providing section 220 provides various information to the communication terminal 400 via the relay 300. When the information receiving section 206 receives information included in the connection request, and the session ID stored in the association storage section 202 is included in the information received by the information receiving section 206, the information providing section 220 may provide information to the communication terminal 400 in response to the information received by the information receiving section 206. The information providing section 220 transmits, to the relay 300, for example, the data specified by the data specification information, which has been received by the information receiving section 206.

The information providing section 220 may have an anti-virus section 222 and a transmission data generator 224. The anti-virus section 222 executes the anti-virus measures on the data specified by the data specification information. The anti-virus section 222 may execute the virus determination process to determine whether the data specified by the data specification information is infected with a virus. The anti-virus section 222 may execute the virus handling process on the data when the data is determined to be infected with the virus in the virus determination process.

The process level of the virus determination process executed by the anti-virus section 222 may be lower than the process level of the virus determination process executed by the anti-virus section 322. The process level of the virus handling process executed by the anti-virus section 222 may be lower than the process level of the virus handling process executed by the anti-virus section 322. For example, the anti-virus section 322 may execute the virus determination process and the virus handling process using information on the open network. The anti-virus section 322 may execute the virus determination process and the virus handling process in cooperation with a virus handling service provided by the cloud service 32 arranged in the network 30.

The transmission data generator 224 generates the transmission data based on the data specified by the data specification information. For example, the transmission data generator 224 may acquire the data specified by the data specification information and use the acquired data itself as the transmission data. Also, for example, the transmission data generator 224 acquires a plurality of pieces of data specified by the data specification information and generates transmission data from the plurality of pieces of data. As a specific example, when the data specified by the data specification information is mail data, the transmission data generator 224 generates header list information, which is a collection of header information about the plurality of pieces of mail data, as the transmission data.

Figure 6:
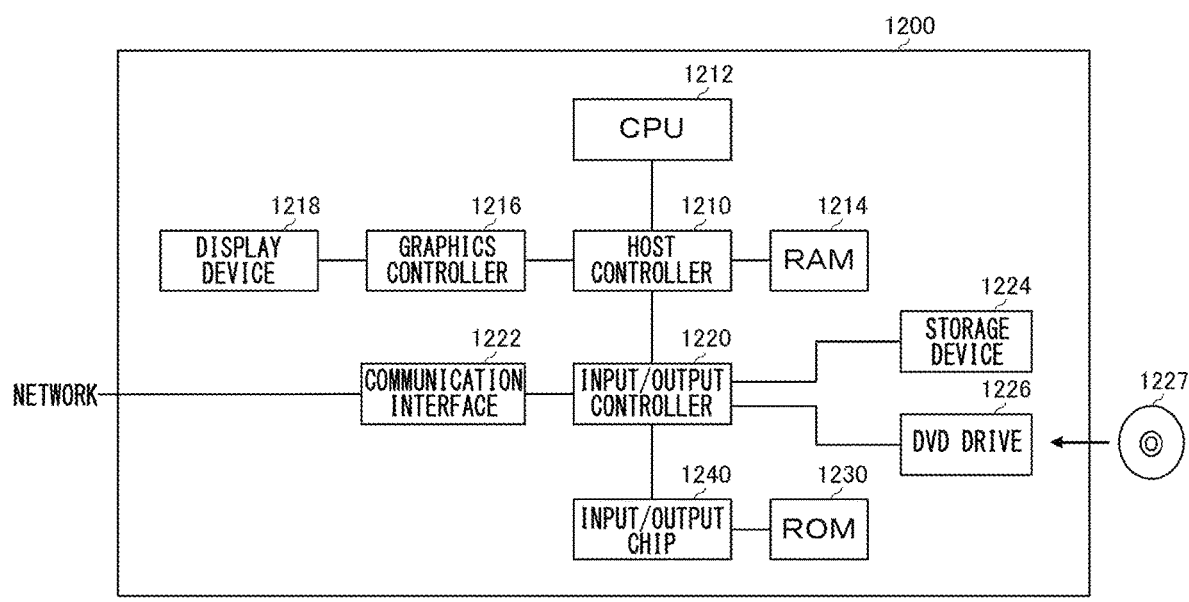
FIG. 6 schematically shows an example of a hardware configuration of a computer 1200 functioning as the information providing device 100.

FIG. 6 schematically shows an example of a hardware configuration of a computer 1200 functioning as the information providing device 200 or the relay 300. A program installed on the computer 1200 can cause the computer 1200 to function as one or more "sections" of the device according to the present embodiment, or can cause the computer 1200 to execute operations or the one or more "sections" associated with the device according to the present embodiment, and/or can cause the computer 1200 to execute a process or a stage of the process according to the present embodiment. Such a program may be executed by a CPU 1212 so as to cause the computer 1200 to execute a specific operation associated with some or all of blocks of the flowcharts and block diagrams described herein.

The computer 1200 according to the present embodiment includes the CPU 1212, a RAM 1214, and a graphics controller 1216, which are interconnected by a host controller 1210. The computer 1200 also includes input/output units such as a communication interface 1222, a storage device 1224, a DVD drive 1226, and an IC card drive, which are connected to the host controller 1210 via an input/output controller 1220. The DVD drive 1226 may be a DVD-ROM drive, a DVD-RAM drive, etc. The storage device 1224 may be a hard disk drive, a solid state drive, etc. The computer 1200 also includes a ROM 1230 and legacy input/output units such as a keyboard, which are connected to the input/output controller 1220 via an input/output chip 1240.

The CPU 1212 operates in accordance with programs stored in the ROM 1230 and the RAM 1214, thereby controlling each unit. The graphics controller 1216 acquires image data generated by the CPU 1212, in a frame buffer or the like provided in the RAM 1214 or within itself, and causes the image data to be displayed on a display device 1218.

The communication interface 1222 communicates with other electronic devices via a network. The storage device 1224 stores programs and data to be used by the CPU 1212 in the computer 1200. The DVD drive 1226 reads a program or data from a DVD-ROM 1227 or the like and provides it to the storage device 1224. The IC card drive reads a program and data from the IC card and/or writes a program and data in the IC card.

The ROM 1230 stores therein a boot program or the like which is executed by the computer 1200 upon activation, and/or other programs that depend on the hardware of the computer 1200. The input/output chip 1240 may also connect various input/output units to the input/output controller 1220 via a USB port, a parallel port, a serial port, a keyboard port, a mouse port, etc.

The program is provided by a computer readable storage medium, such as the DVD-ROM 1227 or an IC card. The program is read from the computer readable storage medium, installed in the storage device 1224, the RAM 1214, or the ROM 1230, which is also an example of the computer readable storage medium, and executed by the CPU 1212. The information processing described in these programs can be read by the computer 1200, resulting in coordination between the programs and various types of hardware resources described above. A device or method may be configured by realizing the operation or processing of information in accordance with the use of the computer 1200.

For example, when communication is to be performed between the computer 1200 and an external device, the CPU 1212 may execute a communication program loaded on the RAM 1214 and provide an instruction to the communication interface 1222 to execute communication processing based on the processing described in the communication program. Under the control of the CPU 1212, the communication interface 1222 reads the transmission data stored in a transmission buffer area provided in the recording medium, such as the RAM 1214, the storage device 1224, the DVD-ROM 1227, or the IC card, transmits the received transmission data to the network, or writes the reception data received from the network on a reception buffer region or the like provided on the recording medium.

The CPU 1212 may cause the RAM 1214 to read all or necessary portions of files or databases stored in external recording media, such as the storage device 1224, the DVD drive 1226 (DVD-ROM 1227), or the IC card, and may execute various types of processing on data on the RAM 1214. The CPU 1212 may then write back the processed data in the external recording medium.

Various types of information, such as various types of programs, data, tables, and databases, may be stored in the recording medium and may undergo information processing. The CPU 1212 may execute, on the data read from the RAM 1214, various types of processing described throughout the present disclosure and including various types of operations specified by the program's instruction sequence, information processing, condition determination, conditional branching, unconditional branching, information search/replacement, etc., and writes back the results in the RAM 1214. The CPU 1212 may search for information in files, databases, and the like in the recording medium. For example, when a plurality of entries, each having an attribute value of a first attribute associated with an attribute value of a second attribute, are stored in the recording medium, the CPU 1212 may search for an entry matching the condition on which the attribute value of the first attribute is specified, from among the plurality of entries, read out the attribute value of the second attribute stored in the entry, and thereby acquire the attribute value of the second attribute associated with the first attribute that satisfies the predetermined condition.

The programs or software modules described above may be stored in the computer 1200 or in a computer readable storage medium near the computer 1200. In addition, a recording medium, such as a hard disk or a RAM, provided in a server system connected to a dedicated communication network or the Internet, can be used as a computer readable storage medium, thereby providing the program to the computer 1200 via the network.

The blocks in the flowcharts and block diagrams in the present embodiment may represent stages of a process in which operations are executed or "sections" of a device serving to execute the operations. Specific stages and "sections" may be implemented by a dedicated circuit, a programmable circuit supplied with a computer readable instruction stored in the computer readable storage medium, and/or a processor supplied with a computer readable instruction stored in the computer readable storage medium. The dedicated circuit may include a digital and/or analog hardware circuit and may include an integrated circuit (IC) and/or a discrete circuit. The programmable circuit may include a reconfigurable hardware circuit, such as a field programmable gate array (FPGA) and a programmable logic array (PLA), which includes a logical product, a logical sum, an exclusive logical sum, a negative logical product, a negative logical sum, and other logical operations, a flip-flop, a register, and a memory element.

The computer readable storage medium may include any tangible device capable of storing an instruction to be executed by an appropriate device. As a result, the computer readable storage medium having an instruction stored therein will be composed of a product containing an instruction that can be executed to create the means for executing the operations specified in the flowchart or block diagram. Examples of the computer readable storage medium may include electronic storage media, magnetic storage media, optical storage media, electromagnetic storage media, semiconductor storage media, etc. More specific examples of the computer readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), Blu-ray (registered trademark) disc, a memory stick, an integrated circuit card, etc.

Computer readable instructions may include any of an assembler instruction, an instruction set architecture (ISA) instruction, a machine instruction, a machine dependent instruction, a microcode, a firmware instruction, state setting data, and a source code or object code written in any combination of one or more programming languages, including object-oriented programming languages such as Smalltalk, JAVA (registered trademark), and C++, and conventional procedural programming languages such as "C" programming language or other similar programming languages.

The computer readable instruction may be provided to a processor or programmable circuit of a general-purpose computer, a special-purpose computer, or other programmable data processing devices locally or via a wide area network (WAN), such as a local area network (LAN) or the Internet, so that the processor or programmable circuit of the general-purpose computer, the special-purpose computer, or other programmable data processing devices can execute the computer readable instruction to generate means for executing the operation specified in a flowchart or block diagram. Examples of the processor include a computer processor, a processing unit, a microprocessor, a digital signal processor, a controller, a microcontroller, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 Communication system,
20 Network,
22 Processing device,

30 Network,
32 Cloud service,
40 Router,
200 Information providing device,
202 Association storage section,
204 Confirmation request transmitting section,
206 Information receiving section,
208 Terminal authentication section,
210 Session ID assigning section,
212 Session ID transmitting section,
214 Transmission permission determining section,
220 Information providing section,
222 Anti-virus section,
224 Transmission data generator,
300 Relay,
302 Connection request receiving section,
304 Connection request storage section,
306 Confirmation request receiving section,
308 Connection request confirmation section,
310 Information transmitting section,
320 Communication relay,
322 Anti-virus section,
400 Communication terminal,
1200 Computer,
1210 Host controller,
1212 CPU,
1214 RAM,
1216 Graphics controller,
1218 Display device,
1220 Input/output controller,
1222 Communication interface,
1224 Storage device,
1226 DVD drive,
1227 DVD-ROM,
1230 ROM,
1240 Input/output chip

What is claimed is:

1. A communication system comprising:
an information providing device arranged in a first network; and
a relay arranged in a second network,
wherein the relay includes:
a connection request receiving section configured to receive a connection request to the information providing device transmitted by a communication terminal arranged in the second network; and
a connection request storage section configured to store the connection request received by the connection request receiving section, and
wherein the information providing device includes:
an association storage section configured to store session identification information about a session between the communication terminal and the information providing device and user identification information about a user of the communication terminal in association with each other;
a confirmation request transmitting section configured to transmit, to the relay, a confirmation request for confirming whether the connection request storage section has stored the connection request to the information providing device transmitted by the communication terminal arranged in the second network;
an information receiving section configured to receive, from the relay, information included in the connection request;
a terminal authentication section configured to determine whether authentication of the communication terminal is permitted based on the user identification information included in the connection request if the session identification information stored in the association storage section is not included in the information received by the information receiving section;
a session identification information assigning section configured to assign session identification information for identifying a session between the information providing device and the communication terminal if the terminal authentication section determines that the authentication is permitted, causing the session identification information to be stored in the association storage section in association with the user identification information about the user of the communication terminal;
a session identification information transmitting section configured to transmit the session identification information to the relay;
an information providing section configured to provide information to the communication terminal in response to the information received by the information receiving section if the session identification information stored in the association storage section is included in the information received by the information receiving section;
a first anti-virus section configured to execute a virus determination process for determining whether data specification information specifying data in the first network is infected with a virus, and to execute a virus handling process on the data if the data is determined to be infected;
wherein the information providing section is configured to transmit, to the relay, the data on which the virus handling process has been executed by the first anti-virus section, if the data specified by the data specification information is infected with a virus; and
the relay includes a second anti-virus section configured to execute a virus determination process for determining whether data received from the information providing section is infected with a virus and to execute a virus handling process on the data if the data is determined to be infected, wherein
the confirmation request transmitting section is configured to establish the session by establishing a TCP connection with the relay and to transmit the confirmation request to the relay via the session, and
the information receiving section is configured to disconnect the session by disconnecting the TCP connection through transmission, to the relay, of an HTTP header specifying closing of the TCP connection, in response to transmission of the session identification information to the relay by the session identification information transmitting section after reception of information included in the connection request from the relay.

2. The communication system according to claim 1, wherein
a firewall having a session timeout function is arranged between the first network and the second network, the session timeout function serving to disconnect the session in response to elapse of a predetermined time after the session is established between a device in the first network and a device in the second network.

3. The communication system according to claim 1, wherein
the association storage section is configured to delete the session identification information if the information receiving section does not receive the session identification information before an elapsed time after the session identification information transmitting section transmits the session identification information becomes longer than a predetermined time.

4. The communication system according to claim 3, wherein
the association storage section is configured to delete the session identification information if the information receiving section does not receive the session identification information before an elapsed time after the information receiving section receives the session identification information becomes longer than a predetermined time.

5. The communication system according to claim 1, wherein the relay includes:
a confirmation request receiving section configured to receive the confirmation request;
a connection request confirmation section configured to confirm whether the connection request is stored in the connection request storage section in response to the confirmation request being received by the confirmation request receiving section; and
an information transmitting section configured to transmit information included in the connection request to the information providing device if the connection request confirmation section confirms that the connection request is stored in the connection request storage section.

6. The communication system according to claim 5, wherein
the connection request receiving section is configured to receive a plurality of connection requests, each being identical to the connection request, transmitted by a plurality of communication terminals in the second network,
wherein the connection request storage section is configured to store each of the plurality of connection requests in association with terminal identification information about each of the plurality of communication terminals, and
the information transmitting section is configured to transmit, to the information providing device, information included in each of the plurality of connection requests if the connection request storage section has the plurality of connection requests stored when the confirmation request receiving section receives the confirmation request.

7. The communication system according to claim 5, wherein
the information transmitting section is configured to transmit the user identification information to the information providing device if the user identification information is included in the connection request stored in the connection request storage section when the confirmation request receiving section receives the confirmation request.

8. The communication system according to claim 5, wherein
the information transmitting section is configured to transmit, to the information providing device, the session identification information and the data specification information specifying data in the first network if the session identification information and the data specification information are included in the connection request stored in the connection request storage section when the confirmation request receiving section received the confirmation request, the information receiving section is configured to receive the session identification information and the data specification information, and
the information providing section is configured to transmit the data specified by the data specification information to the relay.

9. The communication system according to claim 8, wherein the information receiving section is configured to disconnect the session by disconnecting the TCP connection through transmission by the information providing section to the relay, of an HTTP header specifying closing of the TCP connection, in response to transmission of data specified by the data specification information to the relay.

10. The communication system according to claim 8, wherein
the information providing device includes a transmission permission determining section configured to determine whether transmission of the data specified by the data specification information is permitted, based on the session identification information received by the information receiving section, and
the information providing section is configured to transmit the data identified by the data specification information to the relay if the transmission permission determining section determines that the transmission is permitted.

11. The communication system according to claim 1, wherein
a determination level of the virus determination process executed by the first anti-virus section is lower than a determination level of the virus determination process executed by the second anti-virus section,
an association level of the virus handling process executed by the first anti-virus section is lower than an association level of the virus handing process executed by the second anti-virus section, and
the first anti-virus section is configured to execute a virus determination process and a virus handing process using only information that the information providing device has, and the second anti-virus section is configured to execute a virus determination process and a virus handling process in cooperation with a virus handling service provided by a cloud service arranged in a second network.

12. The communication system according to claim 1, wherein
the first network is a closed network, and
the second network is an open network.

13. An information providing device arranged in a first network, comprising:
an association storage section configured to store session identification information about a session between a communication terminal and the information providing device and user identification information about a user of the communication terminal in association with each other;
a confirmation request transmitting section configured to transmit, to a relay arranged in a second network, a confirmation request for confirming whether the relay has stored a connection request to the information providing device transmitted by the communication terminal arranged in the second network;
an information receiving section configured to receive information included in the connection request;
a terminal authentication section configured to determine whether authentication of the communication terminal is permitted, based on user identification information included in the connection request if the session identification information stored in the association storage section is not included in the information received by the information receiving section;
a session identification information assigning section configured to assign session identification information for identifying a session between the information providing device and the communication terminal if the terminal authentication section determines that the authentication is permitted, causing the session identification information to be stored in the association storage section, in association with user identification information about a user of the communication terminal;
a session identification information transmitting section configured to transmit the session identification information to the relay;
an information providing section configured to provide information to the communication terminal in response to information received by the information receiving section if the session identification information stored in the association storage section is included in the information received by the information receiving section;
a first anti-virus section configured to execute a virus determination process for determining whether data specification information specifying data in the first network is infected with a virus, and to execute a virus handling process on the data if the data is determined to be infected;
wherein the information providing section is configured to transmit, to the relay, the data on which the virus handling process has been executed by the first anti-virus section, if the data specified by the data specification information is infected with a virus; and
the relay includes a second anti-virus section configured to execute a virus determination process for determining whether data received from the information providing section is infected with a virus and to execute a virus handling process on the data if the data is determined to be infected, wherein
the confirmation request transmitting section is configured to establish the session by establishing a TCP connection with the relay and to transmit the confirmation request to the relay via the session, and the information receiving section is configured to disconnect the session by disconnecting the TCP connection through transmission, to the relay, of an HTTP header specifying closing of the TCP connection, in response to transmission of the session identification information to the relay by the session identification information transmitting section after reception of information included in the connection request from the relay.

14. The information providing device according to claim 13, wherein the association storage section is configured to delete the session identification information if the information receiving section does not receive the session identification information before an elapsed time after the session identification information transmitting section transmits the session identification information becomes longer than a predetermined time.

15. The information providing device according to claim 14, wherein
the association storage section is configured to delete the session identification information if the information receiving section does not receive the session identification information before an elapsed time after the information receiving section receives the session identification information becomes longer than a predetermined time.

16. A non-transitory computer-readable storage medium having stored therein a program that causes a computer to function as an information providing device arranged in a first network, the information providing device comprising:
an association storage section configured to store session identification information about a session between a communication terminal and the information providing device and user identification information about a user of the communication terminal in association with each other;
a confirmation request transmitting section configured to transmit, to a relay arranged in a second network, a confirmation request for confirming whether the relay has stored a connection request to the information providing device transmitted by the communication terminal arranged in the second network;
an information receiving section configured to receive information included in the connection request;
a terminal authentication section configured to determine whether authentication of the communication terminal is permitted based on the user identification information included in the connection request if the session identification information stored in the association storage section is not included in the information received by the information receiving section;
a session identification information assigning section configured to assign session identification information for identifying a session between the information providing device and the communication terminal if the terminal authentication section determines that the authentication is permitted, causing the session identification information to be stored in the association storage section in association with the user identification information about the user of the communication terminal;
a session identification information transmitting section configured to transmit the session identification information to the relay; and
an information providing section configured to provide information to the communication terminal in response to the information received by the information receiving section if the session identification information stored in the association storage section is included in the information received by the information receiving section;
a first anti-virus section configured to execute a virus determination process for determining whether data specification information specifying data in the first network is infected with a virus, and to execute a virus handling process on the data if the data is determined to be infected;
wherein the information providing section is configured to transmit, to the relay, the data on which the virus handling process has been executed by the first anti-virus section, if the data specified by the data specification information is infected with a virus; and
the relay includes a second anti-virus section configured to execute a virus determination process for determining whether data received from the information providing section is infected with a virus and to execute a virus handling process on the data if the data is determined to be infected,
wherein the confirmation request transmitting section is configured to establish the session by establishing a TCP connection with the relay and to transmit the confirmation request to the relay via the session, and the information receiving section is configured to disconnect the session by disconnecting the TCP connection through transmission, to the relay, of an HTTP header specifying closing of the TCP connection, in response to transmission of the session identification information to the relay by the session identification information transmitting section after reception of information included in the connection request from the relay.

17. An information providing method to be executed by an information providing device arranged in a first network, the method comprising:

transmitting a confirmation request to a relay arranged in a second network for confirming whether the relay has stored a connection request to the information providing device transmitted by a communication terminal arranged in the second network;

receiving information included in the connection request;

determining whether authentication of the communication terminal is permitted based on user identification information included in the connection request if session identification information about a session between the communication terminal and the information providing device stored in an association storage section is not included in the information received in the information receiving step, the association storage section being configured to store the session identification information and the user identification information about a user of the communication terminal in association with each other;

assigning the session identification information for identifying the session between the information providing device and the communication terminal if the authentication is determined to be permitted in the terminal authentication step, causing the session identification information to be stored in the association storage section, in association with the user identification information about the user of the communication terminal;

transmitting the session identification information to the relay; and providing information to the communication terminal in response to the information received in the information receiving step if the session identification information stored in the association storage section is included in the information received in the information receiving step;

executing a first anti-virus determination process for determining whether data specification information specifying data in the first network is infected with a virus, and for executing a virus handling process on the data if the data is determined to be infected;

transmitting, to the relay, the data on which the virus handling process has been executed by the first anti-virus determination process, if the data specified by the data specification information is infected with a virus; and the relay includes a second anti-virus section configured to execute a second anti-virus determination process for determining whether the data specified by the data specification information is infected with a virus and to execute a virus handling process on the data if the data is determined to be infected, wherein the confirmation request transmitting step includes establishing the session by establishing a TCP connection with the relay and transmitting the confirmation request to the relay via the session, and the information providing method comprising, in the information receiving step, disconnecting the session by disconnecting the TCP connection through transmission, to the relay, of an HTTP header specifying closing of the TCP connection, in response to transmission of the session identification information to the relay in the session identification information transmitting step after reception of information included in the connection request from the relay.

* * * * *